Jan. 31, 1939.  R. N. BOSTOCK  2,145,683
FILTER
Filed July 15, 1937
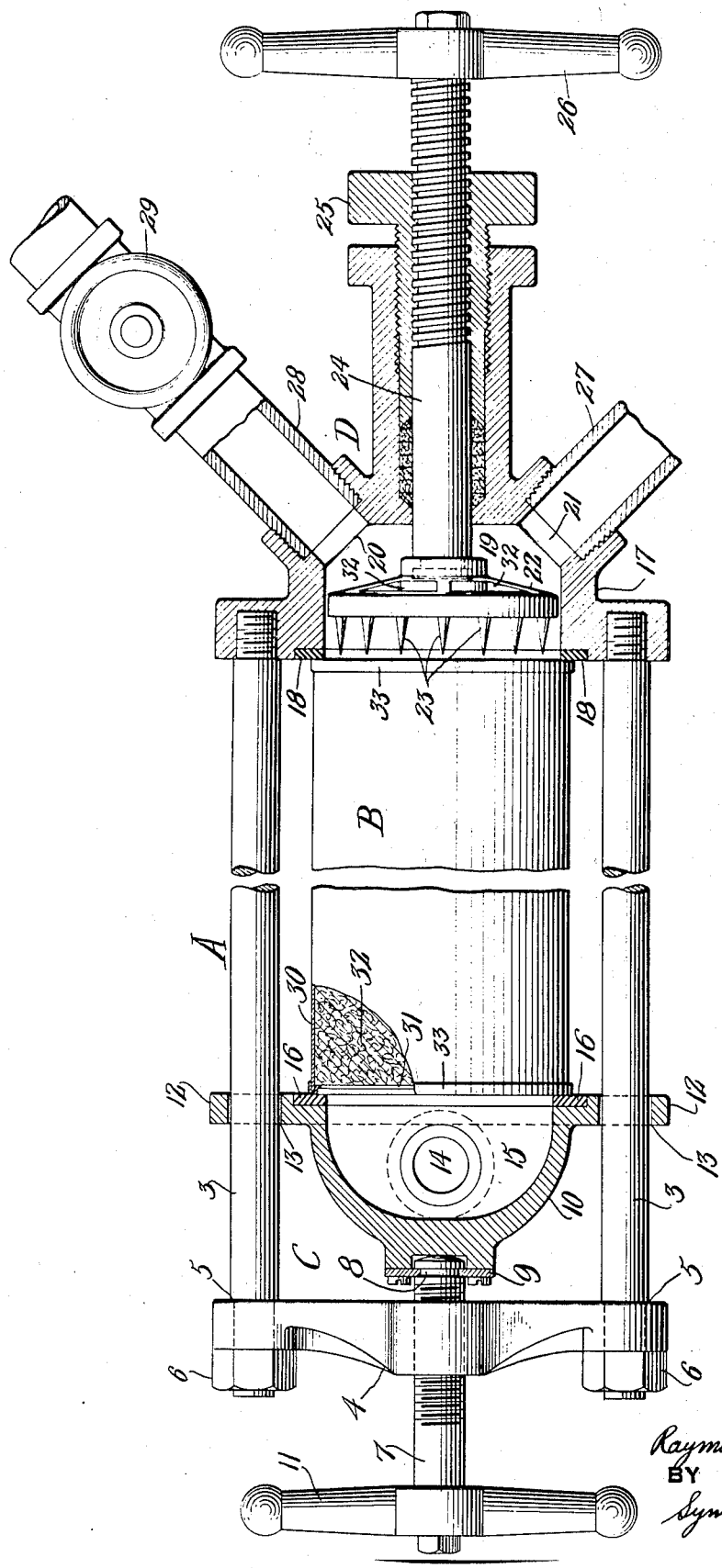
INVENTOR
Raymond N. Bostock
BY
Synnestvedt + Lechner
ATTORNEYS Patented Jan. 31, 1939

2,145,683

UNITED STATES PATENT OFFICE 2,145,683

FILTER

Raymond N. Bostock, Montclair, N. J.

Application July 15, 1937, Serial No. 153,698

3 Claims. (Cl. 183—1)

My invention relates to an air filter and is particularly concerned with a filter in which the air is sterilized.

Sterile air has been secured in a number of ways, the chief of which is filtration through a deep pad of sterile cotton. This is a sure and practical manner of producing sterile air, but with filter heretofore used it is difficult to be certain that the cotton itself is sterile and that other parts of the filter with which the filtered air comes in contact are sterile. One of the chief difficulties has been to prevent exposure of the sterile cotton to unsterile conditions while replacing it in the filter.

It is the primary object of my invention to provide a filter which will overcome the foregoing difficulties and assure sterile conditions in the filter when it is put into use.

A further object of my invention is the provision of a filter in which the sterile cotton can be replaced when necessary without the special precautions and technique required in present filters.

A further object of my invention is the provision of a novel sterile cotton container or cartridge in which the cotton can be easily and effectively sterilized and which can be easily and quickly inserted and removed from the filter without impairing the required sterility of the cotton.

A further object of my invention is the provision of a novel filter in which the parts exposed to unsterile conditions for any reason can be quickly and effectively sterilized.

A further object of my invention is the provision of a filter adapted to use replaceable sealed cotton containers with provision for unsealing the container after it is placed in the filter.

The foregoing, together with such other objects as are hereinafter to be disclosed or are incident to my invention I accomplish by means of the device illustrated in preferred form in the accompaning drawing, wherein—

The figure is a sectional elevation of my novel filter.

Referring to the drawing, the filter comprises two principal parts, the frame A with its connections and the sterile cotton container or cartridge B.

The frame consists of two heads, an inlet head with its connections and operating parts indicated generally by reference letter C, and an outlet head with its connections and operating parts indicated generally by the reference letter D. These heads are connected and held in spaced relation by means of rods 3—3. These rods 3—3 are screwed into outlet head D and the yoke 4 fits over the opposite ends and abuts against the shoulders 5 thereon. The yoke is held on the rods by means of the nuts 6.

The yoke 4 is provided with a central screw threaded opening into which the clamp screw 7 is threaded. This clamp screw is provided with a groove 8 into which the collar 9 is fitted and the collar 9 is secured to the inlet head proper 10. At the opposite end the clamp screw 7 is provided with the handle 11.

The inlet head 10 is provided with lugs 12 having openings 13 for the rods 3. The clearance at the opening 13 is sufficient to permit the head 10 to slide along the rods which act as guides for the head. The head 10 has air inlet opening 14 leading into the central chamber 15 and the head is also provided with a gasket 16 against which the cartridge B can abut. The gasket 16 may be made of rubber or some similar yielding material.

The outlet head consists of the head proper 17, gasket 18 (similar to gasket 16) against which cartridge B abuts, and the central chamber 19 having steam inlet 20 and the outlet 21. The outlet head 17 is also provided with a puncturing device which consists of a head or spider 22 provided with a plurality of spikes 23 on its inner face. Openings 32 in the head 22 are provided so that the head will not unduly obstruct the flow of air. The head 22 is carried by the rod 24 which is screw threaded into the gland nut 25 which in turn is screw threaded into the head 17. The rod is provided with a handle 26 and upon turning this handle the spikes 23 may be moved toward and away from the cartridge B for a purpose to be hereinafter described.

A pipe 27 leads from the outlet 21 to the point or points of use of the sterilized air. The pipe 28 leads from the outlet 20 to a source of steam or other sterilizing fluid medium and is provided with the valve 29 to control the flow to the chamber 19.

The filter cartridge B consists of a cylindrical container, preferably of metal, having a cylindrical side wall 30, closure walls 31 at each end, and rims 33 at each end. The cartridge is filled with sterile cotton 32. The side wall must be of sufficient strength to withstand the internal pressure of the air passing through the cartridge and the pressure of being clamped between the two heads. When so clamped the side wall 30 becomes a part of the air conduit through which the air flows from the inlet head to the outlet head.

The end walls 31 are of such character that they can be punctured or cut without great difficulty. It will also be observed that the closure wall 31 at the outlet end of the cartridge forms a wall of the chamber 19 when the cartridge is clamped in position. The rims 33 must be of such character that an even uninterrupted surface is presented to the face of the gaskets 16 and 18.

The cartridge B may be removed from the filter by retracting the inlet head 10 sufficiently to disengage it from the cartridge. A new cartridge may then be inserted and the inlet head 10 then screwed down tightly. In inserting the new cartridge it is, of course, necessary to be certain that the rims 33 at the ends thereof engage the washers 16 and 18 as there must be an airtight fit between the heads 10 and 17 and the filter cartridge. If desired a centering guide may be secured to the rods 3—3 in order to assure proper positioning of the cartridge when it is being inserted.

The cartridges B are made up and filled with cotton and sealed so that they will be airtight. After filling and sealing, the cartridges and contents are sterilized by heating. The sterilizing can be carried out under ideal sterilizing conditions in well controlled ovens.

Preparation of the filter for use is carried out as follows: One end wall 31 of the filter cartridge B is cut out with an opener of any desired kind. The filter head 10 is retracted sufficiently to allow insertion of the cartridge B between the heads 10 and 17, and the cartridge is placed in position with the rims 33 at the ends thereof in position to engage the washers 16 and 18, with the opened end of the cartridge at the inlet end. The head 10 is then screwed down by turning the handle 11 until the cartridge is firmly clamped between the two heads. Engagement of the washers with the rims 33 of the cartridge will provide an airtight connection between the heads and the cartridge. It will be noted that it is not necessary to maintain sterile conditions at the inlet end of the filter and cartridge as the air entering this end must pass through the sterile cotton in the cartridge before leaving the filter. It is, however, extremely important that all parts at the outlet end of the filter be carefully sterilized. I accomplish this in the following manner. After the cartridge is in place and clamped between the two heads, the valve 29 is opened, admitting the steam or other sterilizing fluid through the pipe 28 to the chamber 19 and through pipe 27 to the point or points of use of the sterilized air. The steam comes in contact with all parts of the filter which may have been exposed to unsterile conditions during replacement of the cartridge. The outside of the outlet end of the cartridge, the chamber 19, the head 22, spikes 23, pipe 27, and all connections clear up to the point of use will be subjected to the sterilizing effect of the steam and will then be in sterile condition. The valve 29 is then turned to shut off the flow of steam, and the air turned into the filter through inlet 14. The head 22 carrying the spikes 23 is now advanced toward cartridge B, by turning the handle 26. The spikes 23 puncture the end wall 31 and the handle 26 is then turned to retract the spikes from the cartridge. The openings made by the spikes provide communication between the interior of the cartridge and the chamber 19. The air is turned into the inlet head before puncturing the cartridge in order to prevent moisture from the outlet head getting back into the cartridge.

The air will now flow through inlet 14 into chamber 15, through the cartridge B and the sterile cotton therein into chamber 19 and thence through pipe 27 to points of use. It may be desirable to allow the sterile air to blow through the filter and connections for a short time before use in order to remove any moisture from the piping. In passing through the sterile cotton the air will, of course, be thoroughly and effectively sterilized.

From the foregoing it will be seen that I have provided a simple and effective filter in which cartridges can be renewed quickly and without particular care being given to maintaining the outside of the fresh cartridge in sterile condition while handling it to place it in the filter. All parts which are exposed to the air passing through the filter are thoroughly sterilized before the air is turned into it, and this is done simply and effectively.

It is not necessary for the user to provide apparatus for sterilization of the cartridge at or near the point of use, and many manufacturers who would not go to the trouble and expense of buying special sterilizing apparatus can use a device of this kind by purchasing a supply of sterile filters which can be kept on hand for replacement as desired.

The technique of use is simple and there is certainty of the sterility of the filter cartridge itself and of the outlet of the filter and all of the piping. The apparatus is relatively inexpensive as compared to the cost of apparatus required at the present time.

It will be readily understood that while I have described the filter in connection with the production of sterile air, it is adapted for other uses such, for example, as special chemical treatments, in which case the cartridge would be filled with any chemical or other material through which it is desired to pass a fluid, either with or without sterilization of the outlet end.

It is also to be understood that I do not confine myself to the use of sterile cotton as a filter medium. Any desired sterilizing material through which the air will pass, may be used.

I claim:

1. A sterile air filter having an air inlet head and an air outlet head having a chamber with a fluid outlet therein, a replaceable filter cartridge between said air inlet head and said air outlet head, said cartridge containing sterile filtering material to filter the air flowing from the inlet head to the outlet head, the said cartridge having a sealed outlet end exposed in the said outlet chamber, means in the said chamber to open the said sealed outlet end of the cartridge and means whereby the said outlet chamber, the opening means and the parts of the outlet head and cartridge which will be exposed therein to sterile air may be sterilized after the cartridge is inserted and before the sealed outlet thereof is opened, and means outside of the chamber for manipulating the said opening means to open the sealed end of the cartridge whereby the cartridge may be opened without destroying the sterilized condition of the elements.

2. A sterile air filter having an air inlet head and an air outlet head having a chamber with a fluid outlet therein, a replaceable filter cartridge between said air inlet head and said air outlet head, said cartridge containing sterile filtering material to filter the air flowing from the inlet head to the outlet head, the said cartridge having a sealed outlet end exposed in the said outlet chamber, means in the said chamber to open the said sealed outlet end of the cartridge and a fluid inlet in said chamber whereby a sterilizing fluid may be admitted thereto to sterilize the said outlet chamber, the opening means and the parts of the outlet head and cartridge which will be exposed therein to sterile air, after the cartridge is inserted and before the sealed outlet thereof is opened, and means outside of the chamber for manipulating the said opening means to open the sealed end of the cartridge whereby the cartridge may be opened without destroying the sterilized condition of the elements.

3. A sterile air filter having an air inlet head and an air outlet head having a chamber with a fluid outlet therein, a replaceable filter cartridge containing sterile filtering material, means to secure the said cartridge in airtight contact with each of said heads whereby it forms an airtight conduit between said heads through which the air must pass when flowing from the inlet to the outlet head, the said cartridge having a sealed outlet end exposed in the said outlet chamber, means in the said chamber to open the said sealed outlet end of the cartridge and means whereby the said outlet chamber, the opening means and the parts of the outlet head and cartridge which will be exposed therein to sterile air may be sterilized after the cartridge is inserted and before the sealed outlet thereof is opened, and means outside of the chamber for manipulating the said opening means to open the sealed end of the cartridge whereby the cartridge may be opened without destroying the sterilized condition of the elements.

RAYMOND N. BOSTOCK.